(12) United States Patent
Edwards et al.

(10) Patent No.: US 6,701,253 B2
(45) Date of Patent: Mar. 2, 2004

(54) TOTAL CORRECTION STRATEGY

(75) Inventors: Stephen J. Edwards, San Francisco, CA (US); Paul W. McBurney, San Francisco, CA (US)

(73) Assignees: Eride, Inc., San Francisco, CA (US); Seiko Epson Corporation, Tokyo (JP)

( * ) Notice: Subject to any disclaimer, the term of this patent is extended or adjusted under 35 U.S.C. 154(b) by 133 days.

(21) Appl. No.: 10/079,217

(22) Filed: Feb. 19, 2002

(65) Prior Publication Data

US 2003/0163256 A1 Aug. 28, 2003

(51) Int. Cl.[7] .............................................. G06F 19/00
(52) U.S. Cl. .................. 701/214; 701/215; 342/357.03; 342/357.1
(58) Field of Search ................................ 701/214, 213, 701/215; 342/357.01, 357.02, 357.06, 357.03, 357.1, 357.12, 358

(56) References Cited

U.S. PATENT DOCUMENTS 6,469,663 B1 * 10/2002 Whitehead et al. ..... 342/357.03
6,567,041 B1 * 5/2003 O'Dell .................. 342/357.03

* cited by examiner

*Primary Examiner*—Tan Q. Nguyen

(57) ABSTRACT

A navigation-satellite receiver network comprises a server connected to the Internet to provide real-time correction information to clients. The server includes a GPS receiver that provides for tracking of a constellation of navigation satellites. When a client is online, it can receive satellite position and velocity information in the form of a polynomial and coefficients. Clock, ionosphere, troposphere, and other corrections are all bundled into one polynomial. The client therefore never computes or uses almanac or ephemeris.

6 Claims, 1 Drawing Sheet

US 6,701,253 B2

TOTAL CORRECTION STRATEGY

FIELD OF THE INVENTION

Figure 2:
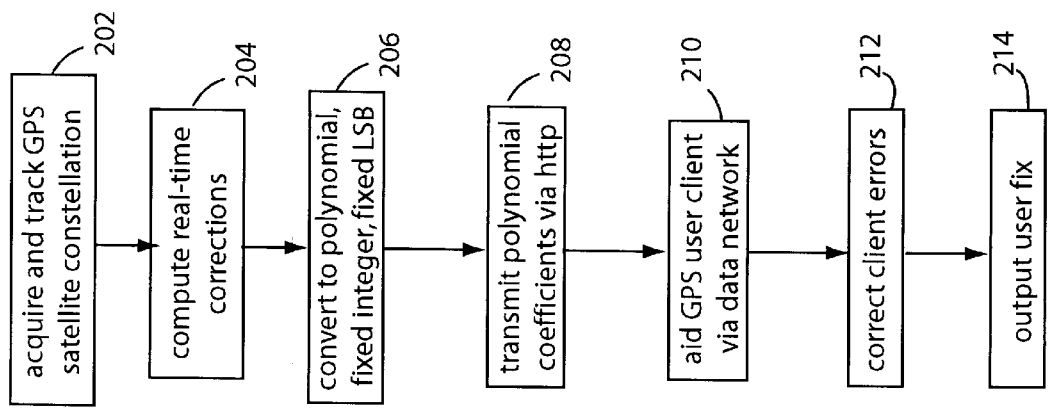

The present invention relates to navigation satellite receivers, and more particularly to methods and systems for remotely aiding the operation of navigation satellite receivers by supplying ionosphere, troposphere, relativistic effects and the satellite vehicle's bias and drift (dtsv), earth rotation, and other correction information.

DESCRIPTION OF THE PRIOR ART

Global positioning system (GPS) receivers measure signals received from several earth-orbiting satellites to determine user position and velocity, and other navigational data. Because the receiver and satellite clocks are not perfectly synchronized, such clock offset acts as an error on the distance to the satellite. The apparent distance is called the "pseudorange" (PR). The clock error can be computed by assuming all the pseudoranges to the different satellites will have the same clock offset in one measurement epoch. So four satellites are needed for a position fix, three for latitude, longitude and height or (X, Y and Z), and one for the clock offset.

Other errors on the distances to the satellites are caused by variations in the radiowave propagation speed and earth rotation. The propagation changes are caused by ionospheric and tropospheric phenomenon.

The two basic types of GPS positioning systems are real-time navigation and high-precision carrier phase positioning. Real-time navigation systems collect a minimum of four pseudorange (PR) measurements to four satellites. The PR measurements are used to solve for the three-dimensional coordinates of the receiver and the clock offset between the receiver oscillator and GPS system time. Differential GPS (DGPS) also collects the pseudorange observables, and further obtains real-time corrections for the errors inherent in the measurements.

Beacon stations have been erected to broadcast discrete real-time corrections over other radio channels and networks. Such corrections are usually specific to the local geographic area. A DGPS receiver in the local area can provide far better accuracies when its navigation solutions have benefited from such corrective information. But, each correction has conventionally required a discrete calculation. And each such calculation adds to the CPU overhead, which-costs processing time and hardware expense.

SUMMARY OF THE INVENTION

It is therefore an object of the present invention to provide a method and system for providing and using real-time corrections for the errors inherent in GPS pseudorange measurements.

It is another object of the present invention to provide a method and system for improving the accuracy of navigation devices.

It is a further object of the present invention to provide a satellite-navigation system that is inexpensive.

Briefly, a navigation-satellite receiver network embodiment of the present invention comprises a server connected to the Internet to provide real-time correction information to clients. The server includes a GPS receiver that provides for tracking of a constellation of navigation satellites. When a client is online, it can receive satellite position and velocity information in the form of a polynomial coefficients. Clock, ionosphere, troposphere, and other corrections are all bundled into a second polynomial. The client therefore never computes or uses almanac or ephemeris.

Another advantage of the present invention is that a system and method are provided that lead to reduced equipment and usage costs.

These and other objects and advantages of the present invention will no doubt become obvious to those of ordinary skill in the art after having read the following detailed description of the preferred embodiments which are illustrated in the various drawing figures.

IN THE DRAWINGS

Figure 1:
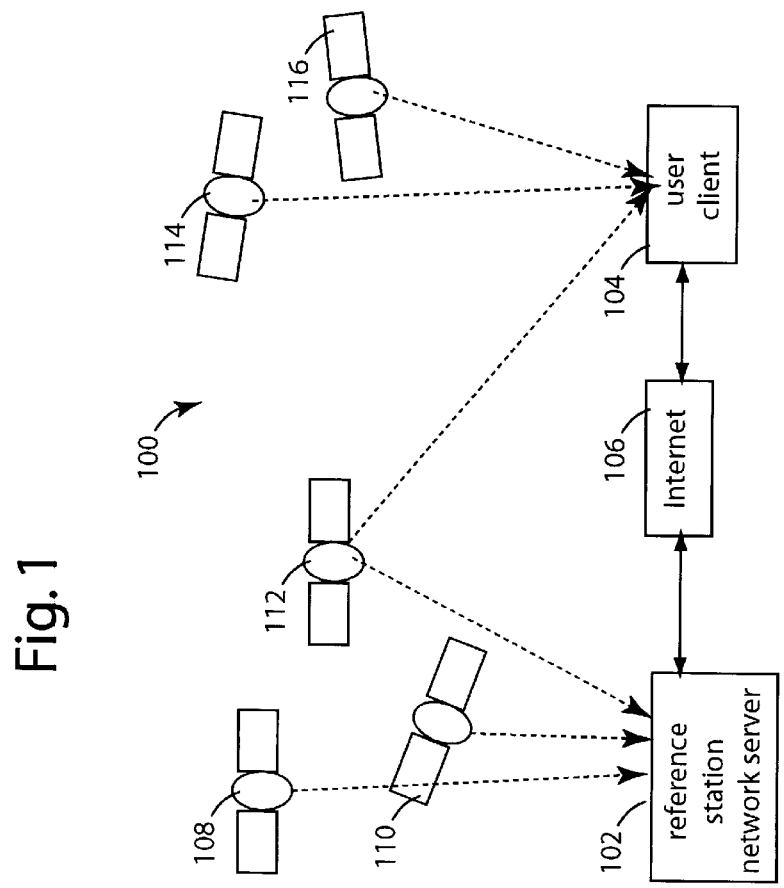

FIG. 1 is a functional block diagram of a network system embodiment of the present invention wherein a server is assisting a client with real-time correction information communicated over the Internet; and FIG. 2 is a flowchart diagram of a method embodiment of the present invention that provides and uses real-time correction information encoded as polynomials and supplied on demand over the Internet as in the network system in FIG. 1.

DETAILED DESCRIPTION OF THE PREFERRED EMBODIMENT

It is very expensive, on a number of scores, for a navigation receiver to work with the full ephemeris or full almanac to compute the satellite position and velocity. A large number of complex, non-arithmetic calculations need. to be processed, e.g., trigonometric and calculus computations. A satellite position and velocity model (SPV) polynomial is used in all embodiments of the present invention to approximate satellite position and velocity. A polynomial fit is made for a couple of positions and velocities, then this polynomial can be used to approximate satellite position and velocity at any time in a small interval. It is important in evaluating various SPV's to consider speed, storage, and accuracy for both position and velocity. The inherent quantization error can also be corrected for with help from the server. In general it is necessary to obtain position errors of about one meter, velocity errors better than 0.01 m/s, time errors of less than $10^{-6}$ seconds, and to minimize storage and calculation times.

FIG. 1 illustrates a network system 100, in an embodiment of the present invention, that includes a GPS reference station and network server system 102, a GPS user and network client system 104, and an intervening computer network 106 such as the Internet. The GPS reference station and network server system 102 critically provides error models and corrective information over the network 106 to help the GPS user and network client system 104 provide better and more rapid position solutions.

The server system 102 includes a navigation satellite receiver that has locked onto and is tracking a constellation of navigation satellites 108, 110, and 112. Some of these may also be visible to the client system 104. So the GPS reference station and network server system 102 knows time, and knows its fixed position and how the GPS solutions it computes differ from its surveyed position. The GPS reference station and network server system 102 is therefore able to generate simplified, polynomial error models and information from this data. The GPS reference station and network server system 102 is in a position to measure local ionospheric and tropospheric effects that will exist in the local geographic area. So if the GPS user and network client system 104 are in that local area, differential corrections can be employed to good effect.

The server system 102 is intended to be always on and tracking its constellation of navigation satellites 108, 110, and 112. It is then able to discern accurate, absolute system time and may also provide current ephemeris, troposphere, ionosphere, and other information to other navigation satellite receivers on the network. Such information can be provided as a service, on a per-use charge or as a subscription.

GPS pseudo range corrections traditionally include ionosphere, troposphere, relativistic effects and the satellite vehicle's bias and drift (dtsv), and earth rotation corrections. The satellites themselves fly a complex path that is represented by a satellite position and velocity model (SPV).

Another constellation of navigation satellites, including 114 and 116 is visible to client system 104. The client system 104 includes its own navigation satellite receiver, but such may not have yet locked onto and be tracking its constellation of navigation satellites 112, 114, and 116.

Embodiments of the present invention can be divided into three levels of correction assistance to the user 104. These correspond to three different network client types, autonomous, demi-autonomous using ASPV's, and demi-autonomous using SPV's.

In general, method embodiments of the present invention calculate a "corrTotal" variable, which is the sum of all the corrections for a particular time and user position. The first and second derivatives are used with respect to the time of correction, to calculate an approximate correction for a user that has not changed position. A position-movement threshold is preferably included such that if the user position has changed too much, all the correction terms will automatically be recalculated for the new location. For example, $$\text{correction}(t_{fix}) = \text{corrTotal}(t_{ref}) + \text{corrRamp}(t_{ref})\Delta t + \text{corr2nd}(t_{ref})\Delta t^2$$

$$\text{corrDot}(t_{fix}) = \text{corrRamp}(t_{ref}) + 2\text{corr2nd}(t_{ref})\Delta t^2, \text{ where } \Delta t = t_{fix} - t_{ref}$$

An autonomous client 104 uses ephemeris information to create satellite position and velocity models (SPV's) every thirty-two seconds. The sum of the correction terms is calculated, e.g., corrTotal. An approximation is calculated to the first derivative of correction, with respect to time, using the so-called "a1" term of dtsv, with satellite velocities in place of satellite positions for earth rotation. These are then summed into the corrRamp variable. A second derivative, corr2nd, includes only the so-called "a2" term of dtsv. These two terms are then used to calculate a total correction for a particular position fix.

A demi-autonomous client 104 using ASPV's relies on corrections that are sent from the server 102. The server will solve the corrections in double at the start of the ASPV, $t_{ref}$, then using the correction values at $t_1 = t_{ref} + \Delta t$, and $t_2 = t_{ref} + 2\Delta t$ to create a polynomial in time for the correction. The coefficients of such polynomial are calculated using, $$\begin{bmatrix} cor_0 \\ cor_1 \\ cor_2 \end{bmatrix} = \begin{bmatrix} 0 & 0 & 1 \\ \Delta t^2 & \Delta t & 1 \\ 4\Delta t^2 & 2\Delta t & 1 \end{bmatrix} \begin{bmatrix} corr2nd \\ corrRamp \\ corrTotal \end{bmatrix},$$

which solves to give, $\text{corrlTotal} = cor_0$ $\text{corrRamp} = (4cor_1 - cor_2 - 3cor_0)/(2\Delta t)$ $\text{corr2nd} = (cor_2 - cor_1 + cor_0)/(2\Delta t^2)$ These coefficients are used by the client 104 to calculate the correction value at the time of position fix. If the user position moves too far, the network client 104 must ask the server 102 for new correction terms for the new user position. ASPV's use $\Delta t = 400$, because it maintains a relatively small error over the whole 900 second window of the ASPV. For the demi-autonomous client using SPV's, the same coefficients are used with $\Delta t = 16$.

Table I summarizes the results that were obtained in one series of tests of various prototype SPV model implementations, A–F, of the present invention. Under the SPV "Model" column, the "p" is the number of positions and "v" is the number of velocities used to calculate the coefficients. An "O2" means a second order polynomial, "O3" is a third order, etc. The "delt" is a time test. Under the "#Eph" column, the number of ephemeris or other full position and velocity routines that are needed to calculate the coefficients. The "#Calcs Coef" is a rough approximation for the number and type of calculations required for both coefficients and position and velocity. The "#Calcs SPV" lists the number of multiplies and adds. The "#Coef" column lists the number of polynomial coefficients used. The resultant errors obtained with the various models are listed in the maximum position error "Max Pos Err" and maximum velocity error "Max Vel Err" columns.

TABLE I

| Model | #Eph | #Calcs Coef | #Calcs SPV | #Coef | Max Pos Err | Max Vel Err |
|---|---|---|---|---|---|---|
| A 3p's O2 | 3 | 3 adds | 2m's 3a's | 9 | 0.2758 | 0.0677 |
| B 4p's O3 | 4 | | 4m's 5a's | 12 | 0.2345 | 0.0578 |
| C 2p's 2v'sO2 delt = 64 | 2 | 4 adds | 2m's 3a's | 9 | 2.392 | 0.042 |
| D 3v's 2p O3 | 3 | 7 adds 1 mult | 4m's 5a's | 12 | 1.0409 | 0.00029544 |
| E O2 Pos & O2 Vel | 3 | 6 adds | 4m's 5a's | 18 | 0.6409 | 0.0001 |
| F 2p's 2v's O2 delt = 32 | 2 | 4 adds | 2m's 3a's | 9 | 1.8703 | 0.0112 |

Model-E and model-F were studied in greater detail. Model-E consisted of 2p's 2v's O2 delta t=32 seconds, and Model-F used independent O2 Pos polynomials and O2 Vel polynomials for each. For both models, time relative to the start of the interval is used. For Model-E, a second position and velocity is taken at t0+Δt where Δt=32 seconds. In matrix form, the equations for the calculations of the coefficients were, $$\begin{bmatrix} p_{-1} \\ p_0 \\ p_1 \end{bmatrix} = \begin{bmatrix} \Delta t^2 & -\Delta t & 1 \\ 0 & 0 & 1 \\ \Delta t^2 & \Delta t & 1 \end{bmatrix} \begin{bmatrix} A_2 \\ A_1 \\ A_0 \end{bmatrix}$$

$$A_2 = (p_{-1} - 2p_0 + p_1)/(2\Delta t^2),\ A_1 = (p_1 - p_{-1})/(2\Delta t),\ A_0 = p_0$$

The velocity model is similar, the p's are replaced with v's, and corresponding set of coefficients are used. The position and velocity models are describable as, $$p(t) = A_2(t-t_0)^2 + A_1(t-t_0) + A_0,\ v(t) = B_2(t-t_0)^2 + B_1(t-t_0) + B_0;$$

and is used when $-\Delta t < t < \Delta t$, where $\Delta t = 32$ seconds. Another velocity polynomial was required to improve the velocity accuracy to better than 0.01 m/s. Model-E is more costly in its calculation of the coefficients for both position and velocity. However, compared to Model-F, it maintains better position and much better velocities.

While working with these SPV's, other cost saving measures were found, e.g., the modeling of position, velocity and time as 32-bit integers with fixed least significant bit (LSB) values. A good LSB to use for position was $LSB = 2^{-6}$ meters, and the LSB for velocity was $LSB = 2^{-12}$ meters/second.

The 32-bit words with fixed LSB values allows integer math to be used in some calculations, and thereby reduces the storage costs for each variable. Delta time is fixed, $\Delta t = 32$ seconds, and the coefficients are written as 32-bit integers with differently fixed LSB's. For time, $\Delta t$ is less than $\pm 64$ seconds, allowing extra time for calculation overlap. The integer part of $\Delta t$ can be stored in 7-bits including sign, so 25-bit are available for the decimal representation. The $\Delta t$ could be stored in a 16-bit signed integer. But that would only leave 9-bits to represent the decimal portion. Such would provide an accuracy of about 0.002, and is not accurate enough for a good position fix. For Model-E, an unsigned 16-bit number with 5-bits could be used for the integer. And 11-bits used for the decimal. This provides an accuracy of about 0.0005, and is satisfactory for a good position fix. However if $\Delta t > 32$-seconds, the representations would overrun the bits available.

A lean client is one with models for satellite position and velocity that are easy-to-compute. Such models need only be valid for short time spans, rather than the full ephemeredes which are valid for much longer periods. The easy-to-compute models are accentuated with correction polynomials C(t). Each such polynomial is constructed from three reference points. For example, if $C(t_i)_j$ is the correction for the $j^{th}$ SV at time $t_i$, and position x, then, $$C(t_i)_j = -\text{dtsv}(t_i)_j + \text{eRot}(t_i, x)_j + \text{Iono}(t_i, x)_j + \text{Tropo}(t_i, x)_j$$

The "dtsv" term corrects for relativistic effects and the SV's bias and drift. The "eRot" term corrects for earth rotation. The ionospheric and tropospheric terms correct for propagation delays.

There are three types of ionospheric and tropospheric corrections: measured, measured-adjusted, and computed. When a client makes a request from the server, the best estimate of the user position is given to a pre-position engine, and the SV's to be searched are determined. This initial position may be far off from the true user position, and may require another handshake with the server for a better eRot term. For each SV model, a correction polynomial is constructed. Its reference time must be synchronized to the model.

For efficiency, the reference time $t_{ref}$ of an SPV model is strobed to the middle of its validity window. The reference time of the correction $t_{corr}$ is strobed to the beginning of the SPV's validity so that $t_{corr} = t_{ref} - 16$. Thus, demi-SPV clients will also have a validity window of 32 seconds and therefore have the above dtsv, eRot, and atmospheric components computed at $t_{corr}$, $t_{corr} + 16$, and $t_{corr} + 32$ seconds.

Demi-ASPV clients have a validity window of 900 seconds, and therefore have the dtsv, eRot and atmospheric components computed at $t_c + \text{const}$, $t_c + 400 + \text{const}$, $t_c + 800 + \text{const}$ seconds. In the ASPV model, $t_{ref}$ is strobed to the beginning of the validity window. The value of "const" is determined after the LSB of the velocity term in ASPV's is set.

The auto-serve, server-assisted autonomous clients are demi-SPV clients seeded with ephemeris for later use.

There are three basic types of corrections, type-I, type-II, and type-III.

A type-I correction incorporates measured corrections into the client corrections, e.g., the line-of-sight ionospheric, tropospheric and other SV clock or ephemeris errors. The type-I correction therefore needs to be the most accurate of the three types.

In a type-II correction, the routine assumption that the line-of-sight from an SV to a reference station is the same as for a nearby user cannot be used. So a type-II correction further incorporates ionospheric and tropospheric correction constituents into a correction model.

A type-III correction supplies the ionospheric and tropospheric models themselves when no measured data is available for an SV.

The observables sent from the reference station 102 include the pseudo range correction (PRC), computed, e.g., PRC=dy−b, where dy=measured PR−|$X_{sv} - X_{refsta}$|+eRot−dtsv). There are no ionospheric and tropospheric correction constituents in this model. Also $b = \frac{1}{3}\Sigma^3_{smallestpairs} |dy^*_i - dy^*_k|$, where $dy^*_j = dy_j - (I+T)_{model}$.

For pseudo range rate correction (PRRC), given the reference station has zero velocity, PRRC==ddy−d, where $ddy^{sv}$=measuredRangeRate−(U*$V_{sv}$+correctionsDot). There are no ionospheric and tropospheric derivatives in this model. Also, $U = X_{SV} - X_u / |X_{SV} - X_u|$, and $d = \frac{1}{3}\Sigma^3_{pairs} |ddy_i - ddy_k|$, where the pairs are the same as those used for b provided that ddy is less than two-milliseconds.

The PRRC's used on the server are low-pass filtered such that any definite bias is propagated. If they are mostly noise, the PRRC's are set to zero.

There is a common mode bias in the reference stations' PRC's that must be tolerated. Each SV has its own unknown ionospheric and tropospheric line-of-sight errors, and the reference-station itself has a clock bias that affects all the SV's. Thus for any set of "n" SV's being tracked by a reference station, there will be n+1 unknowns. The reference station clock error cannot be completely extracted from the ionospheric and tropospheric line-of-sight errors. However, any residual common-mode reference-station clock bias can be passed onto the user clock bias.

A method embodiment of the present invention can be implemented, as follows:

Let d be the Euclidean distance from the user to the nearest reference station. The user position is typically used in a client-request handler routine.
Let A be the distance within which there is negligible spatial decorrelation between the reference station and the user.
Let B be the distance within which one can perform "adjusted" measured corrections.
Three modes are then defined as:
1. If d ≦ A, Measured corrections;
2. If A < d ≦ B, Measured adjusted corrections; and
3. If d > B, Calculated corrections.

If d < A.
If the user is within A kilometers of a reference station, Attempt to take all the PRC's from that nearest reference station. Those SV's for which the reference station does not have PRC's but are in the client's highN, is dealt with by adding the Iono and Tropo models to the corrections. A small value of A will ensure that there is few such PRC's. Typically they will also correspond to low elevation SV's.

If A < d < B.
That is, if the client is 'local' but far enough that de-correlation will occur, then we will modify the PRC of the nearest reference station so that:
$PRC_{meas\ adj}(t) = PRC + (IonoModel + TropoModel)_{client\ pos}(t) - (IonoMode + TropoModel)_{ref\ sta}(t).$
Even though spatial decorrelation between the user and the reference station may be large, such decorrelation may be approximated by the difference in ionospheric and tropospheric models. Thus, residual ephemeris or SV clock errors may still be mitigated.
No PRC corrections are added to the corrections for SV's not tracked by the nearest reference station; in such cases the calculated Iono and Tropo models is used.

If B<d.
That is, if the client is out of local scope (in global scope) then we perf orm corrections by inserting the Iono and Tropo models to all the corrections.
A correction is a second order polynomial computed at the beginning, middle and end of a model's usability period. The PRC's are propagated into the future using the PRRC'S. The PRRC's are filtered so that they are non-zero only if they exhibit a definite bias. Propagating this bias allows a client to correct, for example, an SV clock that starts drifting wildly.
Let $\Delta(I + T)(t) = (I + T)^{client}(t) - (I + T)^{ref\ sta}(t).$
Let $\Delta SPV = 16s$, and $\Delta ASPV = 400s.$
Let β be an adjustable parameter for possible later use in de-weighting PRRC's (default=1).
Let α be an adjustable parameter for possible later use in de-weighting Iono and Tropo models (default=1).

| Calculation of modes. | DEMI-SPV, i=0,1,2 | DEMI-ASPV i=0,1,2 |
|---|---|---|
| Measured[1] | PRC+iΔSPV*PRRC*β | PRC+iΔASPV*PRRC*β |
| Measured | PRC+Δ (I+T) ($t_{ref}$+iΔSPV) | PRC+Δ(I+T) ($t_{ref}$+iΔAS |
| adjusted[2] | α + iΔSPV*PRRC*β | PV) α + iΔASPV*PRRC*β. |
| Calculated[3] | α (I+T) ($t_i$), $t_i = t_{ref}$+ iΔSPV | α (I+T) ($t_i$), $t_i=t_{ref}$+ iΔASPV |

[1] [2]when no PRC is available for a particular SV, the (I+T) terms are calculated with models at appropriate times.

The auto-serve client is preferably treated as a demi-SPV at initialization.
The filtering is preferably done at high level in the software, e.g., on in "C" source code and Java applets.
On the C side, the filter in continuous mode is such that $$PRRC_i^f = PRRC_{i-1}^f + \alpha(PRRC_i - PRRC_{i-1}^f),$$

where the steady state value of α=1/k, for some integer k=$k_{max}$.
For the initialization, $PRRC_0^f=0$, and the value of α=1/1,1/2,1/3 ... , 1/$k_{max}$ for the first $k_{max}$ data points. Nominally $k_{max}=6$.
On the Java side, For the SPV demi, $PRRC^f$ is used. For the ASPV demi, the following pseudo code is used, if ($PRRC_i^f$ > DRIFTthreshold) nominally DRIFTthreshold=1m/s, and is defined in serverCorr.h
{
    $PRRC_i'=PRRC_i^f$//propagate the drift if bigger than some background noise.
}
else
{
    $PRRC_i'=0$//if there is no "real" drift, do not propagate noise
}

FIG. 2 illustrates a method embodiment of the present invention for supplying and using real-time corrections for GPS receivers on the Internet, and is referred to herein by the general reference numeral 200. The method 200 begins with a step 202 in which the server 102 (FIG. 1) acquires and tracks satellite constellation 108, 110, 112, etc. In a step 204 it has the information necessary to compute and does calculate real-time corrections. It further converts ephemeris and almanac information into a valid-for-a-short-period polynomial. Such polynomial includes satellite position and velocity (SPV). It further can include clock, earth rotation, and atmospheric effects for a local area. A step 206 converts the information in one bundle into polynomial coefficients that are fixed-integer and fixed LSB valued. A step 208 transmits the data on demand from a webserver on the Internet to browsers or other http-clients. For example, such information could be provided for a fee and as a subscription. A step 210 represents a client 104 requesting such transmitted information. A step 212 computes and corrects a user position and velocity. A step 214 outputs the corrected results to a user.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A network-assisted navigation satellite receiver system, comprising:
   a network server with a first navigation satellite receiver for computing accurate time, and satellites' positions and velocities from ephemeris and almanac data;
   a polynomial constructed to encode satellite position and velocity (SPV);
   a second polynomial to encode the satellite corrections;
   a network client with a second navigation satellite receiver that does not compute satellites' positions and velocities from ephemeris and almanac data, and that requests and uses the polynomial; and
   an interconnecting network for communicating information dependent on the polynomial;
   wherein, a user position and velocity solution at the network client is limited to fixed-integer, fixed LSB value arithmetic calculations.

2. The system of claim 1, wherein the interconnecting network further provides for a subscription to updated ones of the polynomial for a fee.

3. The system of claim 1, wherein the network server supports real-time corrections to the network client at one of three assistance levels, autonomous, demi-autonomous with satellite position and velocity (SPV) information, and demi-autonomous with initial SPV information to speed up the first fix.

4. The system of claim 1, wherein the network server provides measured, measured-adjusted, and computed ionospheric and tropospheric corrections, and when the network client makes a request from the network server, a best estimate of a user position is given toga pre-position engine, and any satellite vehicles (SV's) to be searched are determined;
   wherein, for each SV model, a correction polynomial is constructed with its reference time synchronized to such model.

5. A method for supplying and using real-time corrections for GPS receivers on the Internet, the method comprising the steps of:
   acquiring and tracking a first satellite constellation with a first navigation satellite receiver using ephemeris and almanac calculations, and obtaining clock, atmospheric, and other real-time correction information for a local area;
   encoding said clock, atmospheric, and other real-time correction information for a local area into a single polynomial;
   acquiring and tracking a second satellite constellation with a second navigation satellite receiver that does not use ephemeris and almanac calculations, wherein said first and second navigation satellite receivers are collocated within said local area;
   transmitting said polynomial from a network server connected to the first navigation satellite receiver to a network client connected to the second navigation satellite receiver; and
   computing position and velocity of said second navigation satellite receiver with information encoded in said polynomial.

6. The method of claim 5, wherein the step of computing avoids complex calculations and permits substantial savings in computer software and hardware needed to support such in said second navigation satellite receiver.

* * * * *